United States Patent [19]

MacDonald

[11] Patent Number: 5,563,585
[45] Date of Patent: Oct. 8, 1996

[54] WATER PUMP MONITOR

[75] Inventor: Ronald D. MacDonald, Hemet, Calif.

[73] Assignee: See Water Inc., Hemet, Calif.

[21] Appl. No.: 260,121

[22] Filed: Jun. 15, 1994

[51] Int. Cl.$^6$ .................................................. G08B 21/00
[52] U.S. Cl. .......................... 340/626; 340/607; 340/608;
210/435; 210/748
[58] Field of Search ..................................... 340/626, 607,
340/608; 417/63; 210/435, 111, 87, 90,
94, 748

[56] References Cited

U.S. PATENT DOCUMENTS

| 3,423,305 | 1/1969 | Tausk ...................... 204/197 |
| 4,740,317 | 4/1988 | Yost ........................ 210/798 |
| 4,863,591 | 9/1989 | Dionne ...................... 210/94 |
| 4,977,517 | 12/1990 | Gibbs, Jr. et al. ........... 364/510 |
| 5,048,354 | 9/1991 | Mullis Sr. et al. ........ 73/863.25 |

Primary Examiner—Brent A. Swarthout
Assistant Examiner—Julie B. Lieu
Attorney, Agent, or Firm—William Patrick Waters

[57] ABSTRACT

A transparent housing for installation in a marine raw water line. The housing has an inlet chamber including a perforated plate disposed athwart the housing and comprising the downstream wall of the chamber. The plate permits water flow while acting to trap unwanted materials in the water stream. The transparent housing provides means for visual monitoring of the plate and of the interior of the inlet chamber. A sacrificial zinc pencil is disposed within the chamber to protect metal components and to provide a visual indication of the extent of electrolytic activity within the system. Debris in the sea water, for example, or from a broken pump impeller, or portions broken from the sacrificial anode, become trapped in the inlet chamber where they can be visually observed. In such cases, or when anode replacement is desired, the apparatus can be conveniently removed from service while appropriate changes are made.

10 Claims, 1 Drawing Sheet

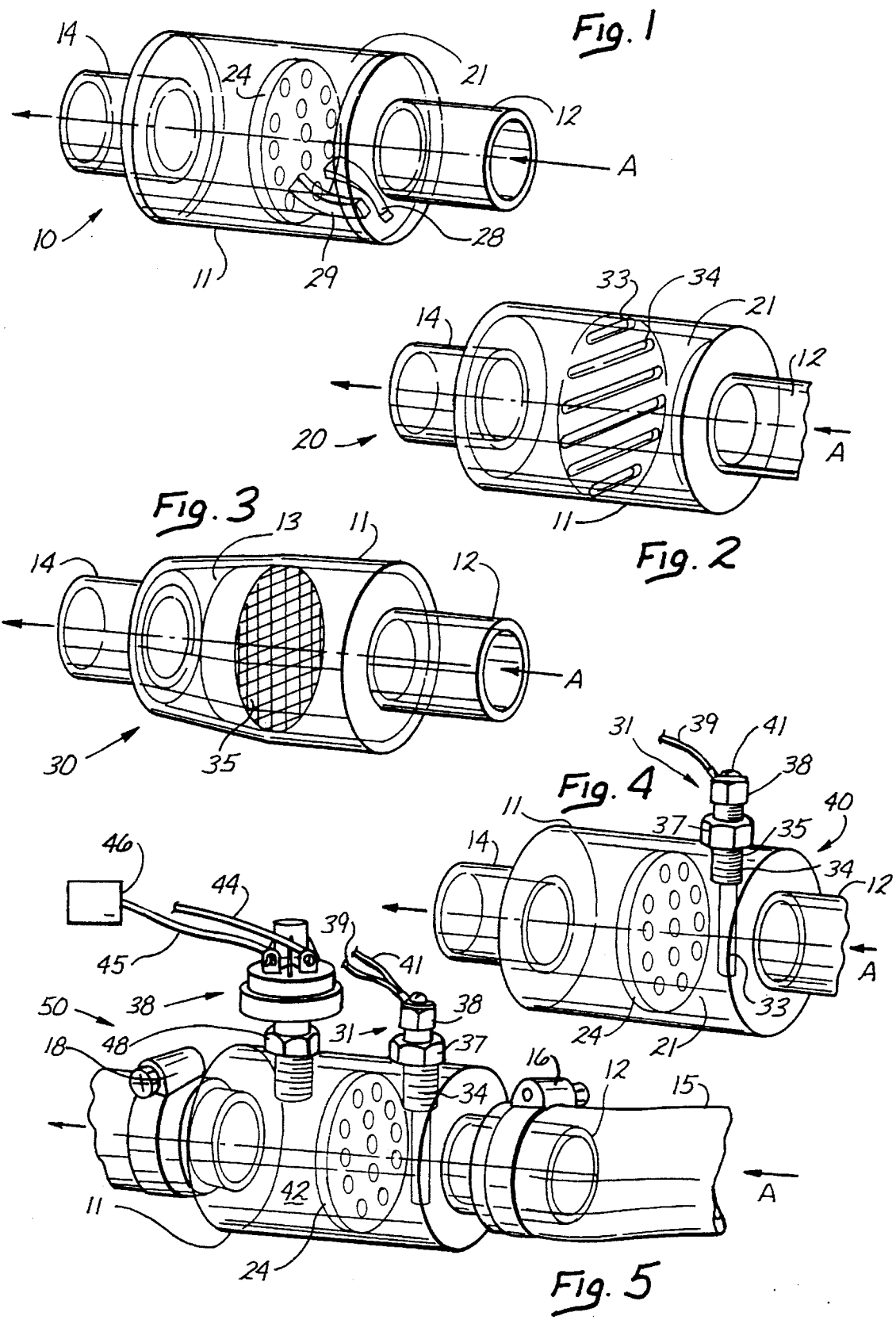

5,563,585

WATER PUMP MONITOR

FIELD OF THE INVENTION

This invention relates generally to devices for monitoring operation of fluid driving pumps and, more particularly, to apparatus for monitoring the function of raw water pumps in marine environments.

BACKGROUND ART

It has been long recognized that fresh water is a very valuable commodity in ocean going vessels. As a result, fresh water is utilized as sparingly as possible and, in some instances, the readily available sea water is utilized. As an example, it is common practice to use raw sea water as the cooling medium in marine engine heat exchangers. This sea water can, in some cases, have a detrimental effect upon the circulatory systems of marine engines because of electrolysis and corrosive effects on metal parts.

In addition, in spite of the diligence of the captain in navigating the boat away from debris in the ocean, it is not uncommon for the sea water ingested into the circulatory system of the vessel to contain debris of various types which can mechanically damage components of the system. Thus, it is recognized that it would be desirable to have an apparatus for reducing, or in some cases, eliminating the unwanted effects of raw sea water in marine circulatory systems in which sea water is utilized for cooling.

In a typical marine heat exchanger, an impeller having hardened rubber blades is utilized to drive the raw sea water through the heat exchanger. Water borne debris introduced into the raw water system can obstruct water passage therethrough, thereby disabling the pump.

Further, in such cases, larger forms of debris can damage the impeller blades when the pump runs in a dry condition. In addition, portions of the blades can break off and these portions, in turn, can significantly damage the heat exchanger. In such cases, where loss of heat exchanger function occurs, engine failure with such unwanted consequences as the necessity of rescue at sea and the expenditure of substantial amounts of money can be experienced. Thus, it would be highly desirable to have an efficient and effective technique for monitoring heat exchanger operation to foreclose damage caused by impeller blade debris. Ideally, such a technique would provide an indication of imminent heat exchanger damage and, in some cases, would function so as to prevent damage to the heat exchanger.

Devices for monitoring the function of mechanical systems are known. For example, in U.S. Pat. No. 2,756,680, there is disclosed a transparent glass plate in an electric motor driven pump wall which enables one to observe pump shaft rotation and direction. Such an arrangement has utility in land based systems but is very limited in confined marine spaces where the marine inboard engine is located. U.S. Pat. No. 3,135,214 discloses a pump attachment for outboard motors located downstream of a propeller. A filtering screen allows passage of water while preventing the passage of objects. While such an arrangement has some value, this device gives no indication of whether or not the pump itself is functioning. In this regard, heat exchanger failure could occur while the pump attachment would give no indication of imminent trouble.

U.S. Pat. No. 5,197,909, there is disclosed an indicator structure for informing an outboard motor operator that the water pump is functioning. Colored flotation members are driven through an upper chamber having a transparent wall for providing a visual display of pump operation. The upper chamber is separated from a lower chamber by a perforated plate which confines the flotation members to the upper chamber while permitting fluid communication between the two chambers. The device has a limitation of being located at some distance from the outboard engine, thus requiring that it be plumbed to the outboard motor water pump exit.

In general, conventional devices are bulky and, in some cases, expensive and not readily adaptable to the marine environment. In addition, while they may afford some sensible indication of engine function, they do not provide a direct capability for preventing damage to engine components. Thus, the prior art fails to disclose an inexpensive pump monitoring apparatus which could be readily installed on marine engines, in confined spaces, and Which could provide a continual real time indication of marine engine conditions while also having a direct damage preventing capability.

In addition to the effects of the unwanted debris in the raw water stream, it is recognized that the electrolytic effect of the raw sea water must be carefully observed in order to avoid irreversible damage to metal parts. In this regard, the use of sacrificial materials, such as zinc anodes, are known. In these cases, the anode material is consumed as a result of galvanic action and, as long as a sufficient amount of such material is available, other metal parts are protected. In this regard, reference may be made to U.S. Pat. Nos. 800,296; 2,523,443; 3,037,920; 3,406,110; 3,423,305; 4,051,007 and 4,789,363. In general, these patents disclose various types of cathode protective materials which, in some cases, are bulky, expensive and ill suited to the confined spaces of ocean going vessels. In addition, such devices sometimes require expensive special housings.

Another limitation to the use of sacrificial anodes is that they are sometimes located in inaccessible areas so that inspection of anode condition is accomplished by a diver or when the boat has been hauled out of the water for maintenance and repair. Thus, for several reasons, anode condition can be difficult to determine. In this regard, unobserved anode deterioration can occur and portions of the anode can break away to be carried by the liquid stream to a heat exchanger or engine component where the portions can obstruct liquid flow, thereby causing damage. Thus, a need exists for a technique for regularly and conveniently assessing anode condition.

In view of the foregoing, it would be highly desirable to have an inexpensive, efficient marine engine monitoring apparatus which would be readily installed and conveniently maintained, even in confined marine engine spaces. Such an apparatus would provide a capability for continual monitoring of flow through the raw water cooling system and would provide a ready indication of the presence of debris in the line. Because of its monitoring applications, such an apparatus could function prophylactically to help prevent marine engine damage while, at the same time, providing a system monitoring capability.

DISCLOSURE OF INVENTION

It is an object of the present invention to provide a new and improved apparatus for providing the capability of continual monitoring of inboard marine engine function.

It is another object of the present invention to provide a new and improved apparatus for preventing damage to marine engine components.

It is another object of the present invention to provide such a new and improved monitoring apparatus which functions in a cost effective manner.

It is a further object of the present invention to provide a new and improved marine engine monitoring apparatus which can be readily installed in confined marine spaces.

It is a still further object of the present invention to provide a new and improved apparatus having a compact arrangement of components to conserve the area required for its installation.

It is still another object of me present invention to provide an improved marine engine monitoring apparatus which is uncomplicated in design and inexpensive.

It is an even still further object of the present invention to provide a marine engine monitoring apparatus which can easily readily installed in a marine engine system without requiring extensive modifications or plumbing.

It is an even still further object of the present invention to provide a marine engine monitoring and protection apparatus which can indicate on a timely basis when maintenance is necessary.

Briefly, the above and further objects of the present invention are realized by providing a transparent housing for installation in a marine raw water line. The housing has an inlet chamber including a perforated plate disposed athwart the housing and comprising the downstream wall of the chamber. The plate permits water flow while acting to trap unwanted materials in the water stream. The transparent housing provides means for visual monitoring of the plate and of the interior of the inlet chamber. A sacrificial zinc pencil is disposed within the chamber to protect metal components and to provide a visual indication of the extent of electrolytic activity within the system. Debris in the sea water, for example, from a broken pump impeller, or portions broken from the sacrificial anode, become trapped in the inlet chamber where they can be visually observed. In such cases, or when anode replacement is desired, the apparatus can be conveniently removed from service while appropriate changes are made. In one embodiment, a pressure sensor can be provided to sense water pressure downstream of the plate. In the event debris sufficiently impaired water flow, the sensor would detect the changed condition and, at a predetermined pressure level, would activate an alarm.

The present invention provides several distinct advantages. First, it can be conveniently installed in a sea water line by means of conventional tools. The apparatus is simple in construction, having no moving parts. It enables one to detect easily the presence of unwanted materials and to determine the condition of the sacrificial electrode. When necessary, the electrode can be easily removed and replaced. Further, because of the transparent housing, water flow through the line can be observed, thereby providing a convenient technique for checking on the condition of the upstream impeller.

BRIEF DESCRIPTION OF DRAWINGS

The above mentioned and other objects and features of this invention and the manner of attaining them will become apparent and the invention itself will be best understood by reference to the following description of the embodiment of the invention in conjunction with the accompanying drawings, wherein:

FIG. 1 is a perspective view of the present invention;

FIG. 2 is a perspective view of another version of the present invention;

FIG. 3 is a perspective view of yet another version of the present invention.

FIG. 4 is a perspective view of the present invention depicting a zinc pencil in the inlet chamber; and FIG. 5 is a perspective view of the present invention depicting a zinc pencil and a pressure sensor.

BEST MODE FOR CARRYING OUT THE INVENTION

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Referring now to the drawings and more particularly to FIG. 1 thereof, there is shown a new pump monitor apparatus 10 which is constructed in accordance with the present invention. The apparatus 10 receives sea water driven under pressure therethrough by an upstream impeller (not shown). The sea water flows in a direction indicated by an arrow A and, after exiting the apparatus 10, the water flows under pressure into a downstream heat exchanger (not shown).

In a preferred embodiment, the apparatus 10 has an elongated housing 11 which is constructed of a suitable clear plastic material. A sleeve 12 on the inlet side of the housing 11, and a similar sleeve 14 on the outlet side, engage a sea water line 15 and are attached thereto in a conventional manner, as for example, by hose clamps 16 and 18, respectively (FIG. 5).

The housing 11 contains a plate 24 which is disposed athwart the housing and defines the downstream side of a chamber 21. The plate 24 contains a plurality of apertures, such as the apertures 26 and 27 which are of a sufficient size and number to permit water to flow readily through the housing 11 while trapping any unwanted debris. In this manner, effective protection of downstream components can be realized. It has been determined that when the line 15 has a conventional one inch diameter, the apparatus 10 performs satisfactorily with a plate 24 having between about 20 and 25 apertures, each aperture being about ⅛th inch in diameter.

As shown in FIG. 1, debris 28 and 29, comprising, for example, portions of an impeller blade, can be trapped by the plate 24 in the chamber 21. In such cases, because of the transparency of the housing 11, the boat operator can readily discover the debris and take such timely corrective action as, for example, shutting the system down and effecting impeller repair. Of course, since the housing 11 can be readily disconnected from the line 15, any trapped debris can be easily removed and the housing reconnected.

Referring now to FIG. 2 in which structural elements previously described in relation to FIG. 1 are designated by identical reference characters, there is shown an apparatus 20 in which the perforated plate of the apparatus 10 (FIG. 1) has been replaced by a plurality of parallel spaced apart rods, such as the rods 33 and 34. In a conventional one inch diameter line, the apparatus 20, having about six rods, each having about a ⅛th inch diameter, is suitable for permitting smooth water flow through the housing 11 while retaining a debris trapping capability. With regard to water flow, the round shape of the rods permits water to flow through the apparatus 20 with very little resistance, while debris trapping capability is retained.

Referring now to FIG. 3 in which structural elements previously described in relation to FIG. 1 are designated by identical reference characters, there is shown an apparatus 30 in which the perforated plate of the apparatus 10 (FIG. 1) has been replaced by a mesh screen 35. Downstream of the screen 35, the chamber 11 is tapered axially to form a tapered outlet chamber 13 which, during pump operation, aids in permitting a smooth flow of sea water through the apparatus 30. When the apparatus 30 is connected to a one inch diameter water line, screen 35 openings of about 3/32 by 3/32 inches are suitable.

Referring now to FIG. 4 in which structural elements previously described in relation to FIG. 1 are designated by identical reference characters, there is shown an apparatus 40 in which a sacrificial anode 31 projects into the chamber 21. Sea water flowing through the housing 11 washes over the surfaces of the anode. The anode 31 includes a zinc barrel 33 and a threaded base 34 for reversible engagement with a threaded aperture 35 in the housing 11. A hex nut 37 serves to hold the anode 31 firmly against the housing 11 and another hex nut 38, threaded to the base 34, serves as a point of electrical contact for a lead 39 for grounding the anode, in a conventional manner, to a heat exchanger (not shown). The lead 39 is attached to the pencil 31, by fastening means in a conventional manner, such as by a screw 41.

The placement of the anode 31 within the chamber 21 permits convenient viewing of the anode so that the boat operator can determine its condition in a very convenient manner. Thus, replacement of a worn anode can be readily accomplished, on a timely basis. In operation, the zinc material of the pencil 31 becomes electrolytically eroded while sacrificially protecting more valuable metal components. If, during the erosion process, portions of the pencil 31 became detached and break away from the pencil, such portions larger than the apertures of the plate 24 will be trapped by the plate and displayed through the transparent wall of the housing 11 from which they can be conveniently removed.

A significant advantage of the present invention is the nonmetallic character of the housing 11. Conventional systems utilizing zinc pencils often have the pencils threaded into a metal receptacle to which it becomes firmly attached as a result of corrosive action of the sea water. In such cases, removal of the anode can be a difficult task, with portions breaking away and causing damage downstream. In the present invention, the nonmetallic character of the housing 11 discourages corrosive bonding and makes anode replacement a simpler and cleaner process.

Referring now to FIG. 5, in which structural elements previously described in relation to FIG. 1 are designated by identical reference characters, there is shown an apparatus 50 which is constructed in accordance with the present invention. Here, pressure sensing means, such a pressure switch 38, is threadly connected to the housing 11 for measuring water pressure in an outlet chamber 42. The switch 38 is grounded by a lead 44 to a suitable metal structure, such as the engine (not shown), and is also electrically connected, by a lead 45, to the negative side of an alarm 46. The alarm 46 can be of any conventional marine alarm configuration including bells, sirens, klaxons and warning lights. With regard to the switch 38, a 2 psi Stewart Warner Instruments, Series III pressure switch, normally open, is suitable. The switch 38 is held in place against the housing 11 by a threaded hex nut 48.

In operation, if for any reason, pressure on the downstream side of the plate would drop, when a preselected pressure is reached, the switch 38, sensing the lower pressure, would generate an electrical signal to energize the alarm 46. In this manner, reaction to unwanted debris buildup, or to upstream impeller failure, could be undertaken quickly before component damage occurred.

It will be recognized that other water pump monitor configurations are within the scope of the present invention. Thus, while particular embodiments of the present invention have been disclosed, is to be understood that various different modifications are possible and are contemplated within the true spirit and scope of the appended claims. There is no intention, therefore, of limitations to the abstract or disclosure herein presented.

What is claimed is:

1. Apparatus, for use in a marine sea water circulatory system, for reducing the effects of electrolysis on marine engine components, comprising:

an elongated housing adapted for installation in a sea water circulatory system for receiving sea water flowing therethrough under pressure, said housing having an anode mounting surface for permitting attachment of an anode to said housing in a leak proof manner;

an elongated sacrificial anode, reversibly fixed to said mourning surface, said anode extending into the housing for the purpose of being contacted by the sea water flowing under pressure trough said housing, for electrolytic action between said sacrificial anode and said sea water, wherein debris from said sacrificial anode break away as a result of said electrolytic action;

means disposed athwart said housing, downstream of said sacrificial anode, for trapping said debris; and window means for permitting observation of said sacrificial anode and said debris trapping means.

2. Apparatus according to claim 1 including pressure sensing means mounted on said housing and having a portion of said sensing means disposed within said housing, downstream of said debris trapping means, said sensing means generating an electrical signal when a predetermined pressure is reached within said housing, downstream of said debris trapping means.

3. Apparatus according to claim 1 wherein said pressure sensing means includes alarm means energized by said pressure means when said predetermined pressure is sensed.

4. Apparatus according to claim 1 wherein said pressure sensing means includes pressure display means.

5. Apparatus according to claim 1 wherein said sacrificial anode is fixed perpendicularly to said mounting surface.

6. An apparatus according to claim 1 wherein said housing includes means for reversibly attaching said housing to a water line.

7. An apparatus according to claim 1 wherein said debris trapping means includes a perforated plate.

8. An apparatus according to claim 1 wherein said debris trapping means includes a plurality of spaced apart rods.

9. An apparatus according to claim 1 wherein said perforated plate includes between about 18 and about 22 apertures.

10. An apparatus according to claim 6 wherein said attaching means includes sleeve means for coupling the apparatus to a line in a water tight manner.

* * * * *